United States Patent [19]

Steudler, Jr.

[11] Patent Number: 4,606,301
[45] Date of Patent: Aug. 19, 1986

[54] NIPPLE FOR FEEDING LIQUIDS TO FOWL AND/OR SMALL ANIMALS

[75] Inventor: Frederick W. Steudler, Jr., New Providence, Pa.

[73] Assignee: Val Products, Inc., Bird-in-Hand, Pa.

[21] Appl. No.: 728,090

[22] Filed: Apr. 29, 1985

Related U.S. Application Data

[63] Continuation-in-part of Ser. No. 595,577, Apr. 2, 1984, Pat. No. 4,524,724.

[51] Int. Cl.<sup>4</sup> ............................................. A01K 7/06
[52] U.S. Cl. ..................................... 119/72.5; 119/75
[58] Field of Search ............................... 119/72.5, 75

[56] References Cited

U.S. PATENT DOCUMENTS

| | | | |
|---|---|---|---|
| 3,669,077 | 6/1972 | Spierenburg | 119/72.5 |
| 3,756,199 | 9/1973 | Clark, IV | 119/72.5 |
| 4,284,036 | 8/1981 | Hostetler | 119/72.5 |
| 4,338,884 | 7/1982 | Atchley et al. | 119/72.5 |
| 4,406,253 | 9/1983 | Atchley et al. | 119/72.5 |

*Primary Examiner*—Hugh R. Chamblee
*Attorney, Agent, or Firm*—Diller, Ramik & Wight

[57] ABSTRACT

This disclosure is directed to a nipple particularly adapted for feeding liquid to fowl and/or small animals, the nipple including a housing having an insert defining a passage through which liquid is adapted to pass from an upstream portion to a downstream portion thereof, a valve in the passage defined by at least one peripheral valve seat and a metallic spherical ball normally resting upon the peripheral valve seat, a stem defined by a head and a pin, the pin having a cylindrical outer surface housed within the downstream passage portion, the downstream passage portion including a frusto-conical outlet surface defined in part by an axial outermost major diameter and an axially innermost minor diameter, the insert further including an annular seat upon which the head normally rests, a flow-control surface between the annular seat and the minor diameter of the frusto-conical outlet surface, the flow-control surface defining with the pin cylindrical outer surface a generally annular flow-control channel through which liquid passes when the valve is unseated from the peripheral valve seat, the frusto-conical outlet surface being of a predetermined maximum angle to the axis thereof, and the flow-control surface having an angle to its axis ranging between 0° and up to but not including the predetermined maximum angle of the frusto-conical outlet surface.

7 Claims, 10 Drawing Figures

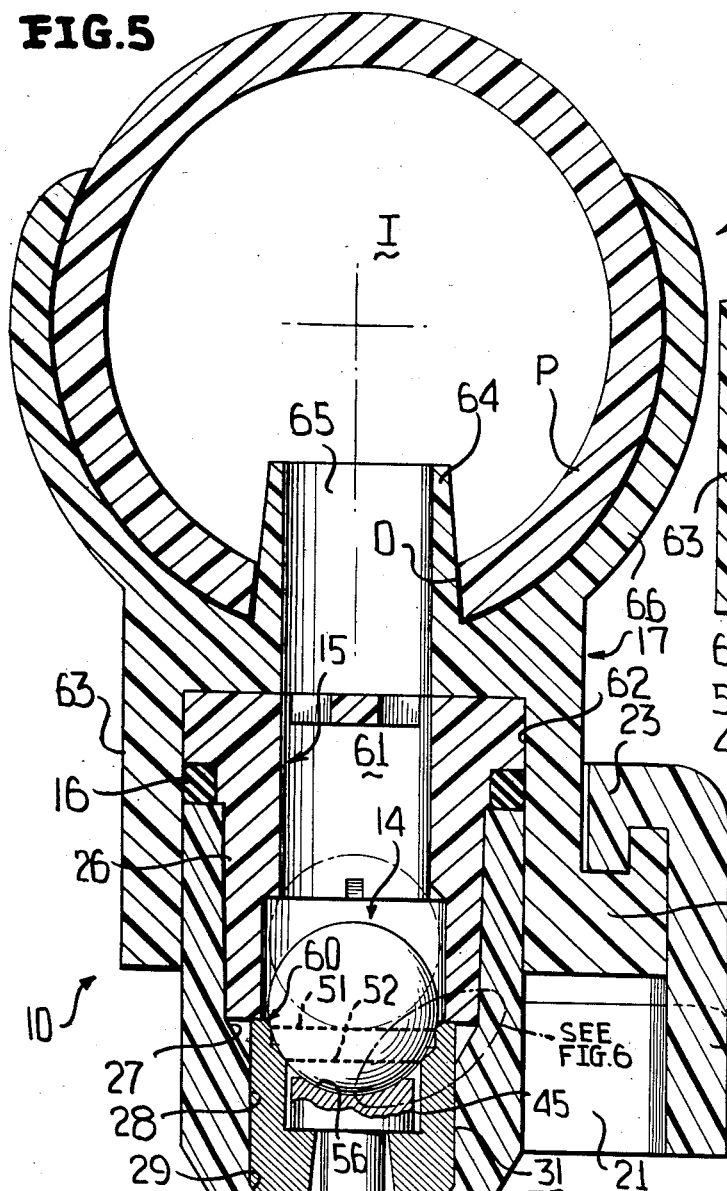
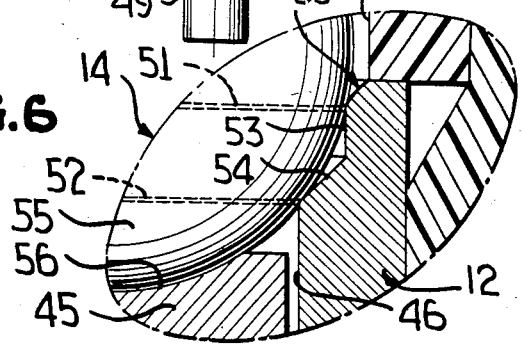
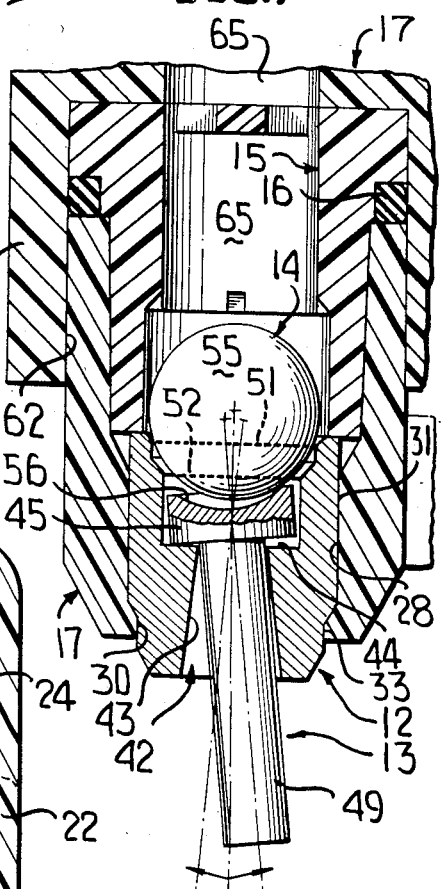
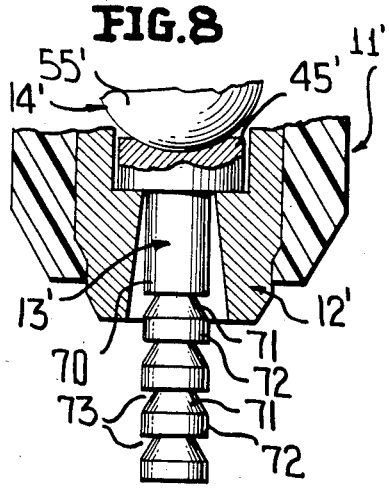

NIPPLE FOR FEEDING LIQUIDS TO FOWL AND/OR SMALL ANIMALS

The present application is a continuation-in-part patent application of United States Patent Application Ser. No. 595,577 filed Apr. 2, 1984 in the name of Frederick W. Steudler, Jr., and now U.S. Pat. No. 4,524,724.

The present invention is directed to an improvement in a nipple particularly adapted for feeding liquid to fowl and/or small animals, and specifically is an improvement over the nipple disclosed in U.S. Pat. No. 4,284,036 in the name of Eldon Hostetler issued on Aug. 18, 1981.

The nipple of the latter-identified patent is disadvantageously formed in part by a flexible pair of rubber seats which deteriorate rapidly under the influence of chlorine, iodine or other chemicals found virtually in all portable water supplies. Such chemicals vary the physical characteristics of the flexible seals resulting in changes which cause erratic operation. For example, apart from pure deterioration of the resilient seats or seals, should the same increase or decrease in flexibility as a result of chemicals in the water, the amount of water released as the ball is unseated will vary from operation to operation. Thus, consistency of performance and longevity are attributes which are simply not possessed by the patented nipple.

The patented nipple also includes a spring for seating the ball upon an actuator pin, and the spring results in a less than compact nipple, not to mention the fact that an additional element (spring) is necessary for desired operability.

Another disadvantage of the patented nipple is the manner in which the ball seats upon a limited portion of the head of the stem or pin which permits a concavity of the head to become partially or completely filled with dirt or similar debris. When the latter occurs, the ball is not as readily triggered through movement of the stem or pin and, just as importantly, the operation of the ball is erratic depending upon the degree of accumulated dirt causing proportionate erratic ball lift and ball lowering. Erratic ball lifting is a major problem, but should the dirt accumulate sufficiently, the ball may not lower to a proper seat creating peripheral leaks along the flexible seal or seals. Such leakage creates a continuous flow of water which passes through associated cages into manure pits therebelow resulting in highly undesired wet manure.

Finally, another disadvantage of the patented nipple is the construction of the valve housing such that a portion thereof projects into the water supply pipe and restricts water flow therethrough. As water flow is restricted, the length of the watering pipeline must necessarily be reduced or delivery must be effected from the middle of the line or from both ends, both of which is cumbersome and can be difficult.

In keeping with the foregoing, a primary object of this invention is to provide a novel and unobvious nipple which avoids and overcomes all of the disadvantages latter-noted relative to the patented nipple and does so through a simple and unique nipple structure characterized most notably by a relatively thick-walled metallic machined insert defining a passage through which liquid is adapted to pass from an upstream passage portion to a downstream passage portion thereof, the insert including first and second peripheral valve seats and a metallic ball adapted to be seated thereupon under the influence of gravity/liquid pressure to define respective first and second liquid seals, a stem defined by a head and a pin with the head having a concave surface within which is fully seated a spherical surface of the metallic ball, the pin being positioned for manipulation by fowl and/or small animals to move the head and the metallic ball seated thereon to unseat the same from the first and second peripheral valve seats breaking the respective first and second liquid seals, and means immediately upstream of the most upstream or first peripheral valve seat for both centering the metallic ball relative to both the first and second periheral valve seats and for preventing the establishment of high impact closing forces between the metallic ball and the second peripheral valve seat thereby assuring repetitive formation of the first and second seals absent damage to the metallic ball.

Yet another object of this invention is to provide a novel nipple as aforesaid in which the metallic insert includes an exterior surface press-fit within and against an interior surface of an associated housing.

Yet another object of this invention is to provide a novel nipple of the type heretofore described wherein the first and second peripheral valve seats and the centering and impact force preventing means of the insert are all machine surfaces.

A further object of this invention is to provide a novel nipple as heretofore described wherein the first periheral valve seat is defined by a concavely curved surface, the second peripheral valve seat is also defined by a concavely curved surface, and the centering and preventing means is a smooth curved transition surface defined by a plurality of successive diameters each of which is progressively greater than the diameter of the first peripheral valve seat, as measured in an upstream direction.

A further object of this invention is to provide a novel nipple which provides total flow control over the lifetime of the nipple which heretofore has not been provided by the nipples of the latter-noted patent and application, the latter object being obtained by providing the nipple insert with a flow-control surface between an annular seat of the stem head and the minor diameter of a frusto-conical outlet surface, the flow-control surface defining with a cylindrical outer surface of the pin a generally annular flow-control channel through which liquid passes when the valve is unseated, the frusto-conical outlet surface being of a predetermined maximum angle to the axis thereof, and the flow-control surface having an angle to its axis ranging between 0° and up to but not including the predetermined maximum angle of the frusto-conical outlet surface whereby under even long-term abuse, the size of the annular flow-control channel will remain uniform and, thus, liquid will continue to flow therethrough in a totally constant and regulated fashion.

A further object of this invention is to provide a novel nipple as immediately set forth in the last object wherein the flow-control surface is preferably a cylindrical surface.

With the above and other objects in view that will hereinafter appear, the nature of the invention will be more clearly understood by reference to the following detailed description, the appended claims and the several views illustrated in the accompanying drawings.

IN THE DRAWINGS

FIG. 5 is an enlarged sectional view taken generally along line 5—5 of FIG. 1 and illustrates the lid in its operative position and an upper housing secured to the water pipe through a saddle bonded thereto.

FIG. 6 is an enlarged fragmentary sectional view of the encircled area of FIG. 5 and more clearly illustrates the spherical ball fully seated upon its mirror image peripheral valve seats.

FIG. 7 is an axial sectional view of the nipple similar to FIG. 6, but illustrates the stem moved to a position unseating the ball resulting in the flow of liquid through the passage and down the stem to an awaiting fowl or small animal.

FIG. 8 is a fragmentary sectional view of another embodiment of the invention, and illustrates a stem having alternating cylindrical and frusto-conical portions defining annular waterretaining gaps therebetween.

Figure 1:
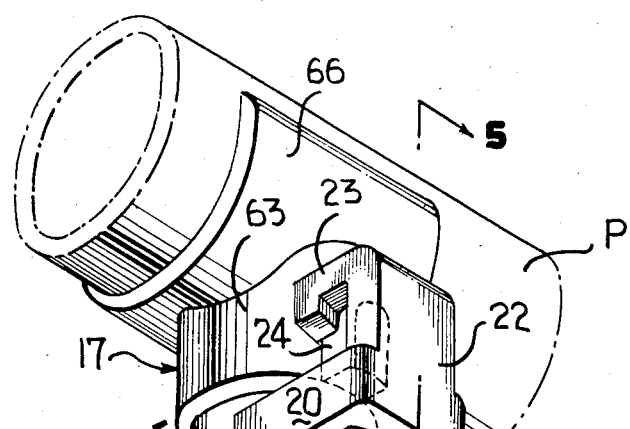
FIG. 1 is a perspective view of a novel nipple constructed in accordance with this invention, and illustrates the nipple connected to a plastic water pipe.

A novel nipple constructed in accordance with this invention is generally designated by the reference numeral 10, and is formed by a lower plastic housing 11, a metallic insert 12, a metallic stem 13, a metallic spherical ball 14, a plastic lid 15, and O-ring seal 16 of rubber or similar material, and an upper plastic housing 17.

The lower plastic housing 11 of the nipple 10 includes a pair of radially outwardly directed legs 20, 21 (FIG. 1) spanned by a bight wall 22 to which is integrally formed an inverted J-shape hook 23. The hook 23 cooperates with a radially outwardly and upwardly directed projection 24 (FIGS. 1 and 5) of the upper housing 17 to releasably interlockingly secure the housing 11, 17 to each other as will be described more fully hereinafter.

Figure 2:
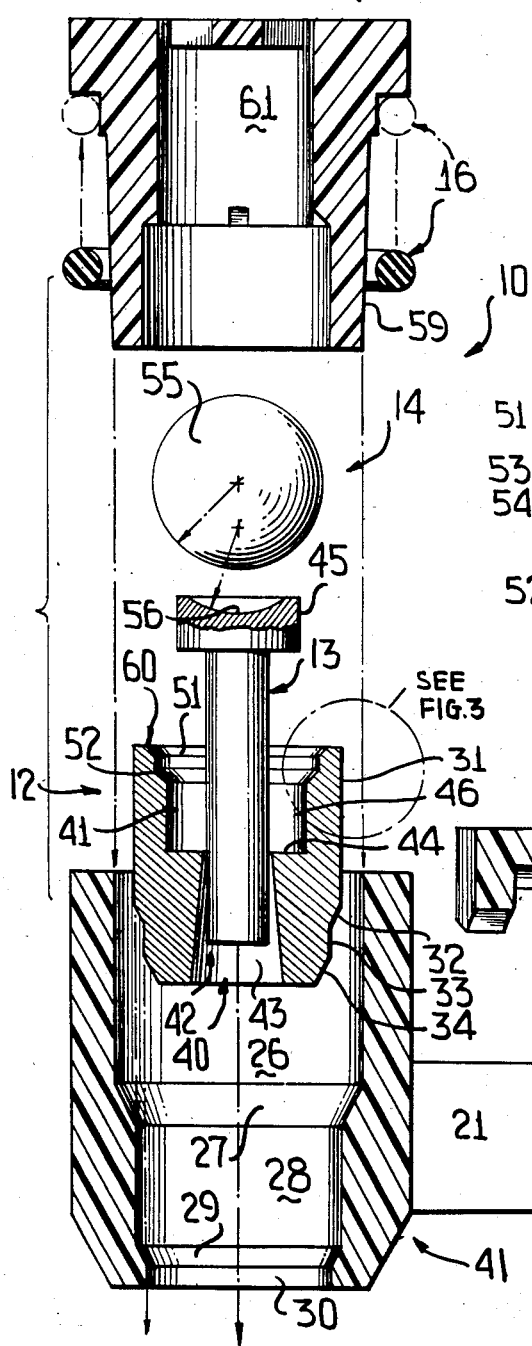
FIG. 2 is an exploded axial section view of a portion of the nipple of FIG. 1, and illustrates several components thereof prior to assembly including a plastic housing, a metallic insert defining a flow passage, a stem, a spherical ball, a lid and an O-ring seal.

The lower housing 11 is preferably injection molded and includes a cylindrical surface 26 (FIG. 2) blending with a frusto-conical surface 27 which in turn blends with another cylindrical surface 28, which in turn blends with another frustoconical surface 29, and the latter blends with a final cylindrical surface 30. The tolerances of the surfaces 28, 30 are such as to form a press-fit with corresponding surfaces of the insert 12 as will be described more fully hereinafter.

Figure 4:
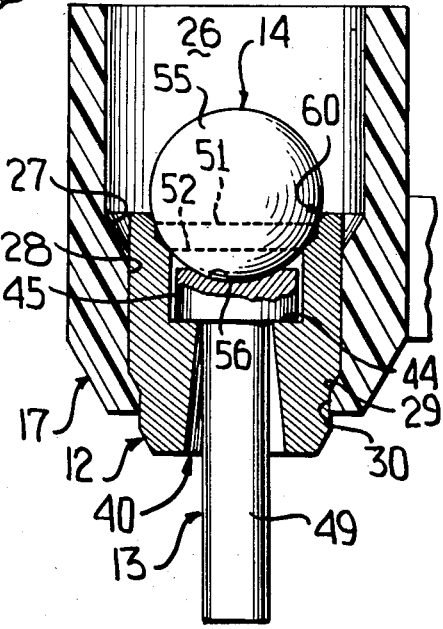
FIG. 4 is an axial section view of a partial assembly of the nipple and illustrates the insert press fit in the lower housing, the stem within a passage of the insert, and the ball seated against and upon both valve seats and fully within a concave surface of a head of the stem.

The insert 12 is constructed of stainless steel and includes an outer cylindrical surface 31, a frusto-conical shoulder 32, another cylindrical surface 33, and a frusto-conical surface 34. The insert 12 is press-fit into the lower housing 11 bringing the surfaces 31, 33 of the insert 12 into press-fit relationship with the respective surfaces 28, 30 of the lower housing 11 (FIG. 4). Due to the relatively thick walled cross section of the insert 12, the various machined surfaces and the extremely high tolerances thereof remain unchanged and/or unaffected by the press-fit relationship between the lower housing 11 and the insert 12.

The stainless steel insert 12 is machined both externally and internally, including the surfaces 31 through 34 and the entire interior of the insert 12 defining a flow passage for liquid (water) which is generally designated by the reference numeral 40. The flow passage 40 includes an upstream end portion 41 and a downstream end portion 42, the latter of which is defined by a frusto-conical wall 43 defining an included angle of 7° to the vertical or to the axis of the passage 40. An annular shoulder 44 of the passage 40 forms a seat for a head 45 of the stem 13, as is most readily apparent from FIGS. 4 and 5 of the drawings.

Figure 3:
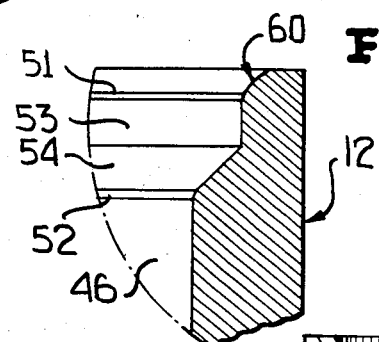
FIG. 3 is an enlarged fragmentary sectional view of the encircled portion of FIG. 2, and illustrates two peripheral valve seats of the insert of a concave configuration conforming to the exterior surface of the ball.

Upstream of the annular shoulder 44, the insert 12 includes a cylindrical surface 46 and first and second peripheral valve seats 51, 52, respectively (FIG. 3). The peripheral valve seat 51 is radially outwardly offset from the peripheral valve seat 52 and valve seats 51, 52 are immediately adjacent a cylindrical surface 53 and a frusto-conical surface 54, respectively. The first and second peripheral valve seats 51, 52 have identical outwardly opening concave surfaces which are mirror images of an exterior surface 55 of the ball 14. Obviously, the diameter of the peripheral valve seat 52 is less than the diameter of the peripheral valve seat 51 and the diameter of the latter is less than the diameter of the ball 14. Hence, in the fully seated position of the ball 14 (the solid lines in FIG. 5 and FIG. 6), the surface 55 of the ball 14 seats with exactitude against the concave surface 51, 52 and defines therewith first and second peripheral liquid seals (unnumbered). In the same fully seated position of the ball 14 relative to the peripheral valve seats 51, 52, the surface 55 also fully seats within and upon an upwardly opening concave surface 56 (FIGS. 4, 5 and 6) of the head 45. Due to the latter relationship, dirt, grime or like contaminants carried by water flowing through an associated pipe P (FIG. 1) and eventually flowing through the passage 40 can not accumulate upon the concave surface 56 and, thus, the movement of the ball 14 is repetitively accurate during both opening and closing operations, i.e., unseating of the ball 14 relative to the periheral valve seats 51, 52 (FIG. 7) and seating thereupon to form the peripheral liquid seals (FIGS. 4, 5 and 6). In the absence of the latter full-seated relationship between the concave surface 56 and the surface 55, debris which might otherwise accumulate therebetween would result in the ball 14 being raised slightly from its normal (closed) position thereby creating a liquid leak at one or more of the peripheral valve seats 51, 52. The accumulation of such dirt or debris also renders erratic the opening operation as the stem 13 is cocked or moved (FIG. 7) by a small animal or fowl. In such cases, overwatering might occur due to such accumulated dirt or debris, the disadvantage resulting therefrom resides primarily in the fact that the water simply drips through the associated cages and collects in a manure pit therebelow resulting in highly undesired extremely wet manure. However, the latter is totally obviated by the perfectly matched seating between the surface 55 of the ball 14 and the concave surface 56 of the head 45.

The insert 12 also includes means generally designated by the reference numeral 60 (FIGS. 3 and 6) in the form of a peripherally disposed convex surface located immediately upstream from the first peripheral valve seat 51 which is operative for both centering the metallic ball 14 relative to both the first and second peripheral valves 51, 52, respectively, and for preventing the establishment of high impact closing forces between the metallic ball 14 and both peripheral valve seats 51, 52, but most notably the second peripheral valve seat 52, to assure repetitive formation of the two peripheral seals absent damage to the surface 55 of the metallic ball 14. Stated otherwise, the convex surface 60 progressively increases in diameter in the upstream direction from the peripheral valve seat 51 beginning with a minor diameter less than the diameter of the ball 14 and a major diameter greater than the diameter of the ball 14, as is most readily apparent from FIGS. 5 and 6 of the drawing. During repetitive seating and unseating of the ball 55, the same rarely, if ever, moves perfectly vertically upwardly and downwardly to make total peripheral contact with the valve seats 51, 52. Instead, the ball 14 is indiscriminately moved repetitively in a variety of different directions depending upon the manner in which the small animals or fowl actuate the stem 13. However, irrespective of the ball 14 being axially misaligned as it descends from an unseated position toward the peripheral seats 51, 52, the surface 55 will encounter the convex surface 60 and will not impact against the periheral valve seat 51. Thus, the surface 55 will not be damaged because of the gradual convex curvature of the surface 60, nor will the surface 55 damage either of the peripheral valve seats 51 or 52. The latter would not occur in the absence of the convex surface 60, as can be readily visualized. Absent the surface 60, the ball 14 in its descent to a closing position would impinge directly against either or both of the surfaces 51, 52 and these, in turn, because of the relatively small size thereof (0.003) would either nick the surface 55 or they, themselves, become nicked or damaged. In any event, if this were cumulative, the exacting surfaces 51, 52 and 55 would be nicked, scratched or otherwise abused to such an extent that the lifetime of the nipple 10 would be greatly diminished. However, due to the convex surface 60 and the dimensional relationships (diameters) thereof to the diameter of the ball 14 and the lesser diameters of the peripheral valve seat 51, 52, such impact force defects are totally eliminated, and the lifetime of the operability of the nipple 10 is tremendously increased absent any type of leakage whatever.

Once the insert 12 has been pressed into the lower housing 11 (FIG. 4) and the stem 13 and ball 14 have been positioned therein, as shown in FIG. 4, the lid 15 (FIG. 2) is preassembled by inserting thereupon the O-ring gasket 16 and then simply press-fitting an exterior surface 59 of lid 15 into intimate conformity and gripping engagement with the cylindrical surface 26 of the lower housing 11 resulting in a slight compression of the gasket 16, as is best shown in FIG. 5. The lid 15 includes a passage 61 therethrough, but due to the absence of a spring, as in the patented nipple heretofore described, the axial length of lid 15 is appreciably shorter than the same structure in the patented nipple. This results in an overall axially compact nipple which allows the stem to be located higher in an associated cage than the patented nipple so that the animal or fowl which is watering will peck at or otherwise move the stem 13 from a downward to an upward angle of attack, as opposed to a more perpendicular angle of attack resulting in less water spillage and corresponding less wet manure. In addition, the more compact, squatter, or lesser axial length of the insert 12 permits the same to be housed within a cylindrical bore 62 of a tubular projection 63 of the upper housing 17 wholly exterior of the pipe P and an opening O thereof. Due to the latter, the upper housing 16 is provided with a relatively small diameter tube or tubular portion 64 having a passage 65 therethrough which places an interior I of the pipe P in fluid communication with the passage 61 of the lid 15. However, since the tubular portion 64 is of a small diameter, it permits maximum water flow along the length of the pipe P which, of course, has numerous ones of the nipples 10 secured thereto by bonding associated saddles 66 to the exterior of the pipe P. Because of the small diameter of the tubular portion 64, maximum water flow through the pipe P can be established as, for example, feeding water through a pipe P from one end for a length of 600 feet in accordance with the present invention, whereas the patented nipple can only feed water in a line 280 feet long, but even at that the same must be fed from the middle or both ends.

In operation water flows through the pipe P and the bores or passages 65, 61 (FIG. 5). With the ball 14 seated (solid lines in FIGS. 5 and 6), flow through the passge 40 of the insert 12 is precluded because of the two liquid seals formed between the surface 55 of the ball 14 and the concave peripheral valve seats 51, 52 (FIG. 6). The ball 14 is thus held in this seated relationship due to its own weight (gravity) and the low pressure of the water upstream thereof. At any such time as the exposed end (unnumbered) of the stem 13 is moved, lifted, tilted, etc. by fowl or small animals, the ball 14 is in turn removed at least partially from the seats 51, 52, as is graphically illustrated in FIG. 7, at which time water descends along a pin 49 of the stem 13 and can be received by the feeding animal. Once the latter (stem 13) is released, the weight of the ball 14 and the water pressure again reseats the ball 14 upon the peripheral concave valve seats 51, 52. As was heretofore described, at any such time that the ball 14 is off-center to the axis of the passage, the convex surface 60 prevents impact forces of the ball 14 from damaging particularly the peripheral valve seat 52, but also the valve seat 51 and, of course, the surface 55 of the ball 14 itself.

Reference is made to FIG. 8 of the drawings in which another embodiment of the invention is illustrated with like elements being identically numbered, though primed. Thus, the nipple 10' of FIG. 8 includes a lower housing 11', an insert 12' and a spherical metallic ball 14'. However, in this case a stem 13' has an identical head 14' and concave surface 56', but a pin 70 thereof is defined by alternating frusto-conical surfaces 71 and cylindrical surfaces 72 defining therebetween annular liquid/water retaining gaps 73. Capillary attraction retains water within the gaps 73 and, thus, during any particular dispensing operation, appreciably more water will be retained upon the pin 70 due to the grooves 73 than upon the perfectly cylindrical pin 49 of the stem 13. Otherwise, the nipple 10' is identical in function and operation to the nipple 10.

Figure 10:
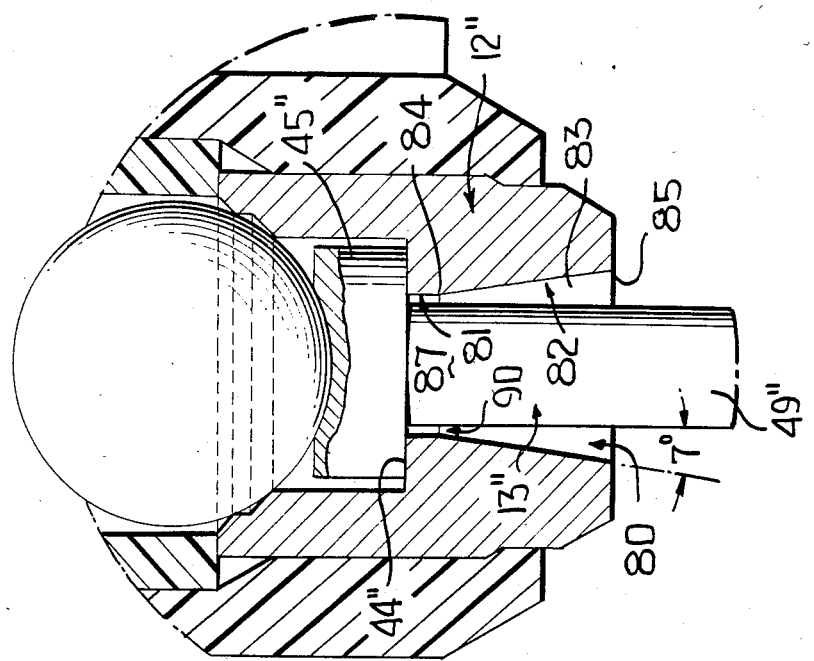
FIG. 10 is an enlarged fragmentary sectional view of the encircled area of FIG. 9, and more clearly illustrates the generally annular flow-control channel.
Figure 9:
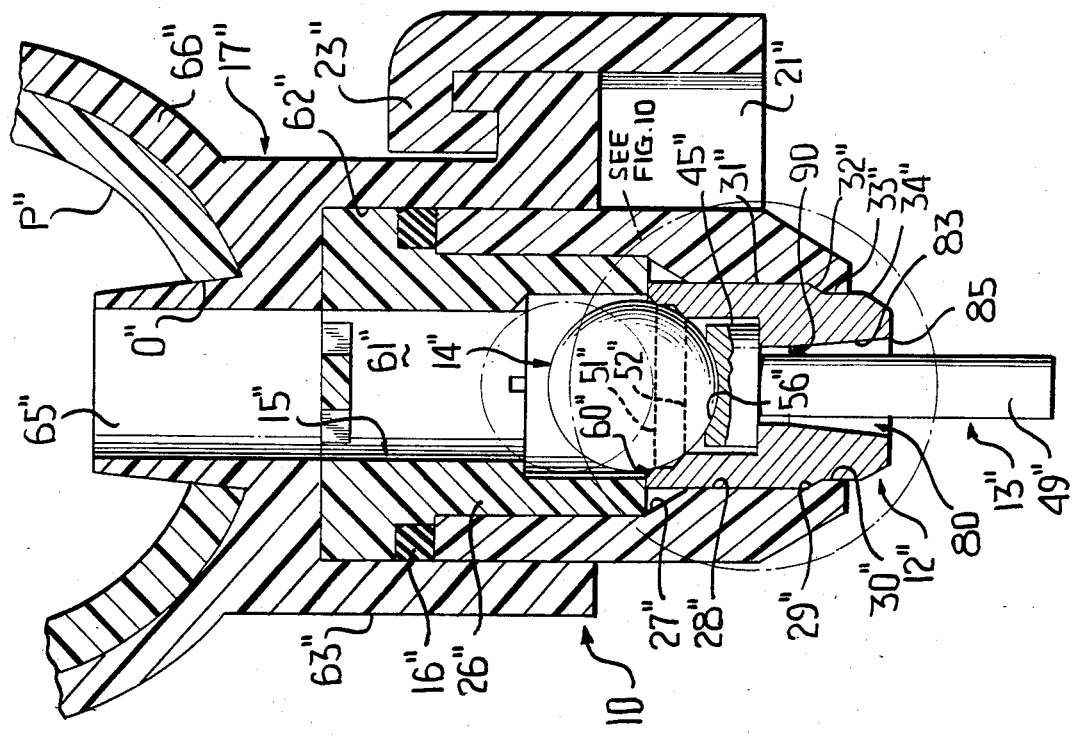
FIG. 9 is an enlarged sectional view of another nipple similar to that illustrated best in FIG. 5, but illustrates a generally cylindrical flow-control passage between a cylindrical flow-control surface of a metallic insert of a nipple and a cylindrical surface of the pin.

Reference is now made to FIGS. 9 and 10 of the drawings which illustrate another nipple 10" which has identical, though double-primed reference numerals corresponding to those of the nipple 10 to designate identical structure. However, in lieu of the frusto-conical wall 43 defining the entire flow passage 40 of the insert 12 of the nipple 10, including the upstream end portion 41 and the downstream end portion 42 thereof, the insert 12" of the nipple 10" includes a liquid flow passage 80 having an upstream end portion 81 and a downstream end portion 82, the latter of which is defined by a frusto-conical wall or surface 83 defining an included angle of 7° to the vertical or to the axis of the passage 80. The frusto-conical surface 83 includes an axially innermost minor diameter 84 and an axially outermost major diameter 85.

The upstream end portion 81 of the flow passage 80 is illustrated as a perfectly cylindrical flow-control surface, which is also designated by the reference numeral 81 and extends axially from the minor diameter 84 to the annular shoulder or radial seat 44" for the head 45" of the stem 13". The pin 49" is, of course, defined by an outer cylindrical surface 87 which defines with the full-control surface 81 a generally annular flow-control channel 90 between the annular seat 44" and the minor diameter 84 of the frusto-conical surface 83. The axial length of the full-control passage 90 can vary, but is preferably in the vicinity of approximately 0.045 inch, as distinguished from the abrupt edge at the intersection of the annular seat 44 and the frusto-conical surface 43 of the insert 12. The latter abrupt edge is subject to a high degree of wear and abuse, as can be readily imagined when one appreciates the continuous motion imparted to the stem 13 (FIG. 7, for example) during not simply months but years of use. The wear of this abrupt edge, even during initial stages, varies the liquid flow ever increasing the same as wear continues, and this in turn causes water which descends down the pin 49 to simply be of an excessive amount capable of being drunk by a feeding fowl or animal. This excessive water simply drops to the brooder floor, wets the animal excrement and this, in turn, creates odor and disposal problems. However, due to the relatively long axial extent and matching surfaces, generally speaking, of the surfaces 87, 84, the size of the annular flow-control passage or channel 90 remains virtually constant over the lifetime of the nipple 10", and excessive liquid flow and the disadvantages noted heretofore simply do not occur.

Though the liquid flow-control surface 81 is preferably perfectly cylindrical, as was heretofore noted, the same may be tapered slightly, but the tapering must never match that of the surface 83, otherwise such matching surfaces would result in the undesired abrupt edge heretofore noted between the surfaces 43", 44" of the nipple 10". Therefore, in the preferred form of the invention, the angle of the frusto-conical surface 83 to its axis is preferably 7° and, thus, the full-control surface 81 can range from a perfect cylinder (0°) upwardly to but not including the 7° or maximum angle, whatever is selected of the frusto-conical surface 83. As an example of the latter, if the frusto-conical surface 83 is between 6°–9°, the flow control surface 81 can be anywhere between 0° up to but not including 6° for the lower range and up to but not including 9° for the upper range of the frusto-conical surface 83.

Although only in a preferred embodiment of the invention as has been specifically illustrated and described herein, it is to be understood that minor variations may be made in the apparatus without departing from the spirit and scope of the invention, as defined in the appended claims.

I claim:

1. A nipple particularly adapted for feeding liquid to fowl and/or small animals comprising a housing including means for defining a passage through which liquid is adapted to pass from an upstream passage portion to a downstream passage portion, valve means in said passage for controlling the flow of liquid therethrough, said valve means including a movable valve and a valve seat within said passage, said valve being seated under the influence of gravity/liquid pressure upon said valve seat in a closed position of said valve means, a stem defined by a head and a pin, the pin having a cylindrical outer surface housed within the downstream passage portion, a metallic insert fit within said housing, said metallic insert defining said valve seat and said downstream passage portion, the downstream passage portion including a frusto-conical outlet surface defined in part by an axial outermost major diameter and an axially innermost minor diameter, said metallic insert having an annular seat upon which the head normally rests, a cylindrical flow-control surface between the annular seat and the minor diameter of the frusto-conical outlet surface, the flow-control surface defining with the pin cylindrical outer surface a generally annular flow-control channel through which liquid passes when the frusto-conical outlet surface is of a predetermined maximum angle to the axis thereof, and the flow-control surface having an angle to its axis ranging above 0° and up to but not including the predetermined maximum angle of the frusto-conical outlet surface, and said predetermined maximum angle is generally 7°.

2. A nipple particularly adapted for feeding liquid to fowl and/or small animals comprising a housing including means for defining a passage through which liquid is adapted to pass from an upstream passage portion to a downstream passage portion, valve means in said passage for controlling the flow of liquid therethrough, said valve means including a movable valve and a valve seat within said passage, said valve being seated under the influence of gravity/liquid pressure upon said valve seat in a closed position of said valve means, a stem defined by a head and a pin, the pin having a cylindrical outer surface housed within the downstream passage portion, a metallic insert fit within said housing, said metallic insert defining said valve seat and said downstream passage portion, the downstream passage portion including a frusto-conical outlet surface defined in part by an axial outermost major diameter and an axially innermost minor diameter, said metallic insert having an annular seat upon which the head normally rests, a cylindrical flow-control surface between the annular seat and the minor diameter of the frusto-conical outlet surface, the flow-control surface defining with the pin cylindrical outer surface a generally annular flow-control channel through which liquid passes when the frusto-conical outlet surface is of a predetermined maximum angle to the axis thereof, and the flow-control surface having an angle to its axis ranging above 0° and up to but not including the predetermined maximum angle of the frusto-conical outlet surface, wherein said housing is defined by an upstream housing portion and a downstream housing portion in relative telescopic relationship to each other, said metallic insert being fit within said downstream housing portion, and axial abutment means between one of said housing portions and said metallic insert for preventing axial removal of said metallic insert from within said downstream housing portion without first disassembling said housing portions.

3. The nipple as defined in claim 2 wherein said upstream housing portion is in internal telescopic relationship to said downstream housing portion, and said axial abutment means is defined by an annular face of said upstream housing portion axially opposing an annular face of said metallic insert.

4. The nipple as defined in claim 3 including shoulder means of said downstream housing portion and said metallic insert in abutment with each other for locating the position of said metallic insert within said downstream housing portion.

5. The nipple as defined in claim 2 wherein said predetermined maximum angle is generally 7°.

6. The nipple as defined in claim 3 wherein said predetermined maximum angle is generally 7°.

7. The nipple as defined in claim 4 wherein said predetermined maximum angle is generally 7°.

* * * * *